US012583877B2

(12) United States Patent
Lu et al.

(10) Patent No.: US 12,583,877 B2
(45) Date of Patent: Mar. 24, 2026

(54) LAYERED SUPERHYDROPHILIC Ti—Cu-MOFs, PREPARATION METHOD AND USE THEREOF

(71) Applicant: ZHEJIANG SHUREN UNIVERSITY, Shaoxing (CN)

(72) Inventors: Yin Lu, Shaoxing (CN); Yonggang Zhao, Shaoxing (CN); Chao Lei, Shaoxing (CN); Mingli Ye, Shaoxing (CN); Taziana Saviskaya, Minsk (BY); Andrei Ivanic, Minsk (BY)

(73) Assignee: ZHEJIANG SHUREN UNIVERSITY, Shaoxing (CN)

( * ) Notice: Subject to any disclaimer, the term of this patent is extended or adjusted under 35 U.S.C. 154(b) by 123 days.

(21) Appl. No.: 18/433,374

(22) Filed: Feb. 5, 2024

(65) Prior Publication Data

US 2024/0174700 A1     May 30, 2024

Related U.S. Application Data

(63) Continuation of application No. PCT/CN2022/124858, filed on Oct. 12, 2022.

(30) Foreign Application Priority Data

Feb. 7, 2022     (CN) .......................... 202210115678.9

(51) Int. Cl.
*C07F 7/28* (2006.01)
*B01J 20/22* (2006.01)
(Continued)

(52) U.S. Cl.
CPC .............. *C07F 7/28* (2013.01); *B01J 20/226* (2013.01); *B01J 20/3078* (2013.01); *B01J 2220/48* (2013.01)

(58) Field of Classification Search
None
See application file for complete search history.

(56) References Cited

U.S. PATENT DOCUMENTS 5,763,658 A      6/1998  Beihoffer et al.

FOREIGN PATENT DOCUMENTS

AU          2010351979 A1    10/2012
CN             1066677 A     12/1992
(Continued)

OTHER PUBLICATIONS

Wang et al., "A cluster-based mesoporous Ti-MOF with sodalite supercages." Chem. Commun., 2017, 53, 11670-11673.*
(Continued)

*Primary Examiner* — Daniel Berns
(74) *Attorney, Agent, or Firm* — Wiersch Law Group

(57) ABSTRACT

Layered super-hydrophilic Ti—Cu-MOFs and a preparation method and use thereof provided, which relates to the technical field of composite materials. According to the present application, copper ions and titanium ions are used as bimetallic centers to have a coordination reaction with rigid aromatic amine ligands, and layered super-hydrophilic Ti—Cu-MOFs with a lamellar structure is efficiently synthesized. Compared with the prior technology, the preparation method of the present application is simple, and the morphology and structure are controllable; the surface of the prepared layered super-hydrophilic Ti—Cu-MOFs are rich in hydroxyl groups, and have high adsorption capacity for phospholipid co-extracts in clinical biological samples, and thus can be used for the analysis of phenothiazine drugs and metabolites thereof in biological samples and realize one-step separation and purification, thus greatly improving the pretreatment efficiency of clinical biological samples and shortening the analysis time.

8 Claims, 2 Drawing Sheets

(51) Int. Cl.
  *B01J 20/28* (2006.01)
  *B01J 20/30* (2006.01)
  *C07F 1/08* (2006.01)

(56) References Cited

FOREIGN PATENT DOCUMENTS

| | | |
|---|---|---|
| CN | 104072525 A | 10/2014 |
| CN | 104280484 A | 1/2015 |
| CN | 104772088 A | 7/2015 |
| CN | 108421531 A | 8/2018 |
| CN | 111333853 A | 6/2020 |
| CN | 111808282 A | 10/2020 |
| CN | 113201148 A | 8/2021 |
| CN | 113398876 A | 9/2021 |
| CN | 114479108 A | 5/2022 |
| IN | 2008CHENP06221 A1 | 3/2009 |

OTHER PUBLICATIONS

International Search Report (PCT/CN2022/124858); Date of Mailing: Jan. 3, 2023.

First Office Action(CN202210115678.9); Date of Mailing: Dec. 5, 2022.

Xia, Wanqiu, et al. "Application of dual-template molecularly imprinted polymer-based solid phase extraction for determination of phenothiazines and benzodiazepines in swine feed" [J]. Analytical Methods, 2018, 10(25): 3001-3010.

Wang, Wenxue, et al. "Determination of Chlorpromazine Hydrochloride in Blood by High Performance Liquid Chromatography with Solid Phase Extraction." Chinese Journal of Hospital Pharmacy. , vol. 32, No. 16, Dec. 12, 2012 (Dec. 12, 2012), p. 1313, section 2.

Zhao X, Wang H, Li B, et al. "Narcissistic self-sorting in anion-coordination-driven assemblies" [J]. Chemical Communications, May 13, 2021, 57(49): 6078-6081.

Song Y P, Li N, Zhang H C, et al. "Dummy template molecularly imprinted polymer for solid phase extraction of phenothiazines in meat based on computational simulation" [J]. Food chemistry, Apr. 26, 2017, 233: 422-428(p. 423, section 2-p. 425, section 3).

Binh N T, Thu P T, Le N T H, et al. "Study on preparation and properties of a novel photo-catalytic material based on copper-centred metal-organic frameworks (Cu-MOF) and titanium dioxide" [J]. International Journal of Nanotechnology, Nov. 24, 2017, 12: 447-455(p. 451, paragraphs 2 and 3).

Wu Ying, et al. "Computational Study of Mechanism and Functionalization of Metal-Organic Frameworks in Adsorption and Separation". China Doctoral Dissertation Full-text Database Engineering Science Series 1, 6, Issue Jun. 15, 2018, B014-122.

Xu Xiaojing, et al. "Synthesis, structure and high-efficiency luminescence property of triphenylamine-based complexes and polymers",Chinese Master's Dissertations Full-Text Database, 1, Issue Jan. 15, 2022, B014-291.

Fukui M, Omori Y, Kitagawa S, et al. "Visible light-induced diastereoselective semihydrogenation of alkynes to cis-alkenes over an organically modified titanium (IV) oxide photocatalyst having a metal co-catalyst" [J]. Journal of Catalysis, May 3, 2019, 374: 36-42.

Meng, Ying, et al. "Investigations on the separation and purification of hemoglobin by use of metal-organic frameworks Y(BTC)(H2O)6." Chinese Master's Dissertations Full-Text Database (electronic journal)., No. 12, Dec. 15, 2018 (Dec. 15, 2018), chapters 2 and 3.

* cited by examiner

LAYERED SUPERHYDROPHILIC Ti—Cu-MOFs, PREPARATION METHOD AND USE THEREOF

TECHNICAL FIELD

The present application relates to the technical field of composite materials, in particular to layered super-hydrophilic Ti—Cu-MOFs and a preparation method and use thereof.

BACKGROUND

Phenothiazine drugs are a typical class of antipsychotic drugs, which have good therapeutic effects in clinic. However, cases of poisoning or even death due to overdose or accidental ingestion occur from time to time, because these drugs are easily metabolized in the body, and the content of prototype drugs in the body is very small. Therefore, it is of great practical significance to establish a simple, rapid and sensitive method for the detection of phenothiazine drugs and metabolites thereof in plasma. In recent years, with the development of mass spectrometry, liquid chromatography-tandem mass spectrometry has become a common method for the detection of residues of phenothiazine drugs in clinical biological samples. At the same time, in order to meet the demand of mass spectrometry for the purification of complex matrices in clinical biological samples, solid phase extraction (SPE), as a rapid sample pretreatment technology, has attracted increasing attention of scholars. In this technology, the complex matrix in sample extract can be adsorbed by an adsorption filler to realize one-step separation and purification of the target analyte.

Metal organic frameworks (MOFs), as a new type of carbon nano-materials, are widely used in the development of SPE (solid-phase extraction) method. However, the existing research pays more attention to using MOFs as an adsorbent to adsorb the target analyte in the sample, rather than to remove the complex matrix in the sample (Meng Ying. Study on the Separation and Purification of Hemoglobin by Metal Organic Framework $Y(BTC)(H_2O)_6[D]$. Northeastern University, 2015; Ling Huijuan, Wu Gege, Li Shuang, et al. Determination of Five Non-steroidal Anti-inflammatory Drugs in Water by Dispersive Solid-phase Extraction-ultra-performance Liquid Chromatography-Tandem Mass Spectrometry based on Metal Organic Framework Composite Aerogel [J]. Chromatography, 2021, http://kns.cnki.net/kcms/detail/21.1185.O6.20211027.1109.002.html). In view of this, it is particularly necessary to develop novel and efficient MOFs for adsorbing complex matrices for the separation and purification of phenothiazine drugs and metabolites thereof.

The structure of MOFs is closely related to the types of metal atoms, organic ligands and/or targeting agents, and the preparation method and reaction conditions will also affect the morphology, crystal structure and porosity of MOFs, and then affect the separation and purification performance of MOFs. In view of the potential purification ability of MOFs materials for complex matrices in clinical biological samples and the difficulty in controllable synthesis of MOFs materials, there are certain technical obstacles to develop a preparation technology of MOFs with controllable morphology, controllable structure and stable performance and apply them to the rapid separation and purification of phenothiazine drugs and metabolites thereof in plasma.

SUMMARY

The present application aims to provide layered super-hydrophilic Ti—Cu-MOFs, a preparation method and use thereof, and the layered super-hydrophilic Ti—Cu-MOFs with controllable morphology, controllable structure and stable performance can be obtained by adopting the preparation method of the present application. The layered super-hydrophilic Ti—Cu-MOFs prepared by the present application have a large adsorption capacity for complex matrices in clinical biological samples, and can realize one-step separation and purification of phenothiazine drugs and metabolites thereof in biological samples.

In order to achieve the above object, the present application provides the following technical solution:

The present application provides a preparation method for layered super-hydrophilic Ti—Cu-MOFs, including the following steps:

mixing a copper source, a rigid aromatic amine ligand, a stabilizer and water, and carrying out a first solvothermal reaction to obtain an intermediate;

mixing the intermediate, a titanium source and an organic solvent, and carrying out a second solvothermal reaction to obtain the layered super-hydrophilic Ti—Cu-MOFs.

Preferably, the copper source is a copper salt; the rigid aromatic amine ligand comprises at least one of 4,4'-diamino-triphenyl and tris(4-aminophenyl)amine; and the stabilizer comprises at least one of sulfamic acid and p-aminobenzoic acid.

Preferably, a mass ratio of the copper source, the rigid aromatic amine ligand and the stabilizer is (0.5-2.0):(0.5-2.0):(0.2-0.8).

Preferably, the first solvothermal reaction is carried out under microwave; a temperature of the first solvothermal reaction is 90° C. to 200° C.; and a duration of the first solvothermal reaction is 12 h to 36 h.

Preferably, the titanium source comprises at least one of tetrabutyl titanate and tetraisobutyl titanate.

Preferably, a mass ratio of the copper source and the titanium source is (0.5-2.0):(0.2-0.8).

Preferably, the second solvothermal reaction is carried out under microwave; a temperature of the second solvothermal reaction is 200° C. to 300° C.; and a duration of the second solvothermal reaction is 12 h to 36 h.

The present application provides layered super-hydrophilic Ti—Cu-MOFs prepared by the preparation method as described in the above technical solution wherein the Ti—Cu-MOFs have a lamellar structure; and the layered super-hydrophilic Ti—Cu-MOFs comprises a hydroxyl group on surface.

The present application provides use of the layered super-hydrophilic Ti—Cu-MOFs prepared by the preparation method as described in the above technical solution or the layered super-hydrophilic Ti—Cu-MOFs as described in the above technical solution as an adsorption filler for cleanup phenothiazine drug and a metabolite thereof.

Preferably, the phenothiazine drug and a metabolite thereof comprise chlorpromazine, chlorpromazine sulfoxide, promethazine and promethazine sulfoxide.

The present application provides a preparation method of layered super-hydrophilic Ti—Cu-MOFs, which includes the following steps: mixing a copper source, a rigid aromatic amine ligand, a stabilizer and water, and carrying out the first solvothermal reaction to obtain an intermediate; and mixing the intermediate, a titanium source and an organic solvent, and carrying out the second solvothermal reaction to obtain layered super-hydrophilic Ti—Cu-MOFs. According to the present application, copper ions and titanium ions are used as bimetallic centers to have a coordination reaction with rigid aromatic amine ligands, and layered super-hydrophilic Ti—Cu-MOFs with a lamellar structure is efficiently synthesized. Compared with the prior technology, the preparation method of the present application is simple, and the morphology and structure are controllable; the surface of the prepared layered super-hydrophilic Ti—Cu-MOFs are rich in hydroxyl groups, and have high adsorption capacity for phospholipid co-extracts in clinical biological samples, and thus can be used for the analysis of phenothiazine drugs and metabolites thereof in biological samples and realize one-step separation and purification, thus greatly improving the pretreatment efficiency of clinical biological samples and shortening the analysis time.

According to the present application, through the controllable preparation of the layered super-hydrophilic Ti—Cu-MOFs, the layered super-hydrophilic Ti—Cu-MOFs can have strong purification ability for complex matrices in clinical biological samples, so that the layered super-hydrophilic Ti—Cu-MOFs are suitable for one-step separation and purification of phenothiazine drugs and their metabolite residues in biological samples. The preparation method of the present application is simple, and the sample pretreatment time and cost are saved. Compared with the existing traditional solid phase extraction technology, including the steps of activation, sample loading, rinsing and elution (Maria Addolorata Saracino, Mario Amore, Elena Baioni, et al. Determination of selected phenothiazines in human plasma by solid-phase extraction and liquid chromatography with coulometric detection. Analytica Chimica Acta, 2008, 624: 308-316; Wang Wenxue. Determination of blood concentration of chlorpromazine hydrochloride by solid phase extraction and high performance liquid chromatography [J]. China Hospital Pharmacy Journal, 2012, 32(16): 1313-1314), the present application has more advantages in the separation and purification of phenothiazine drugs and residues of metabolites thereof in biological samples.

DESCRIPTION OF EMBODIMENTS

Figure 1:
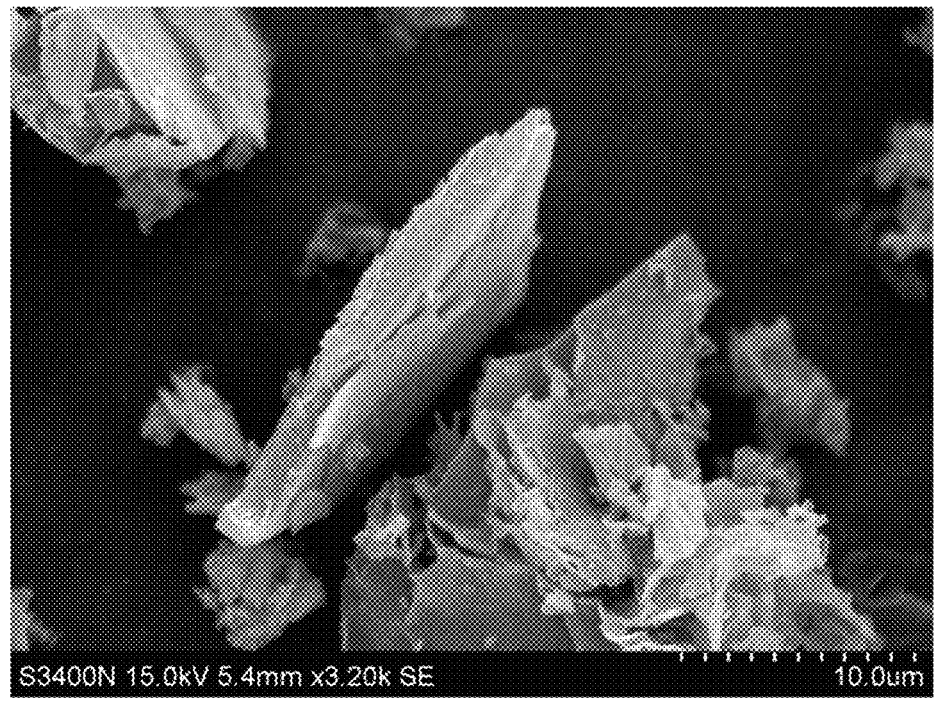
FIG. 1 is a transmission electron microscope diagram of layered super-hydrophilic Ti—Cu-MOFs prepared in Example 1.

The present application provides a preparation method for layered super-hydrophilic Ti—Cu-MOFs, which includes the following:

mixing a copper source, a rigid aromatic amine ligand, a stabilizer and water, and carrying out a first solvothermal reaction to obtain an intermediate;

mixing the intermediate, a titanium source and an organic solvent, and carrying out a second solvothermal reaction to obtain the layered super-hydrophilic Ti—Cu-MOFs.

In the present application, a copper source, a rigid aromatic amine ligand, a stabilizer and water are mixed and the first solvothermal reaction is carried out to obtain an intermediate. In the present application, the copper source is preferably a copper salt, more preferably at least one of copper acetate and copper nitrate; the rigid aromatic amine ligand preferably includes at least one of 4,4'-diaminoterphenyl and tris(4-aminophenyl)amine; and the stabilizer preferably includes at least one of sulfamic acid and p-aminobenzoic acid. In the present application, the mass ratio of the copper source, the rigid aromatic amine ligand and the stabilizer is preferably (0.5-2.0):(0.5-2.0):(0.2-0.8), more preferably 1.0:1.0:0.4. In the present application, an amount ratio of the copper source and water is preferably (0.5 g to 2.0 g):30 mL. In the present application, the water is preferably pure water.

In that present application, the mixing of the copper source, the rigid aromatic amine ligand, the stabilize and the water is preferably carried out in a polytetrafluoroethylene thick-wall pressure-resistant bottle; the mixing is preferably carried out under ultrasonic dispersion; and a duration of the mixing is preferably 30 min.

In the present application, the first solvothermal reaction is preferably carried out under microwave, and in a specific embodiment of the present application, the first solvothermal reaction is carried out in a microwave reactor. In the present application, the temperature of the first solvothermal reaction is preferably 90° C. to 200° C., more preferably 100° C. to 180° C.; the duration of the first solvothermal reaction is preferably 12 h to 36 h, more preferably 24 h. According to the present application, a microwave method is adopted, so that the reaction system can be heated uniformly, and the reaction process can be accurately regulated and controlled, so that a controllable preparation of the morphology and structure of the MOFs can be realized, and the synthesis efficiency of the MOFs is greatly improved.

In the present application, after the first solvothermal reaction, it is preferable to further include: naturally cooling the obtained reaction system to room temperature, and after solid-liquid separation, washing and drying the obtained solid substance in turn to obtain the intermediate. In the present application, the solid-liquid separation method is preferably vacuum filtration. In the present application, the washing preferably includes water washing, methanol washing and acetone washing which are carried out in sequence; the mode of the washing is preferably rinsing. In the present application, the drying is preferably vacuum drying; the temperature of the drying is preferably 30° C. to 90° C., more preferably 60° C.; the duration of the drying is preferably 12 h to 24 h.

After the intermediate is obtained, the intermediate, a titanium source and an organic solvent are mixed, and the second solvothermal reaction is carried out to obtain the layered super-hydrophilic Ti—Cu-MOFs. In the present application, the titanium source preferably includes at least one of tetrabutyl titanate and tetraisobutyl titanate. In the present application, the mass ratio of the copper source and the titanium source is preferably (0.5-2.0):(0.2-0.8), more preferably 0.1:0.4. In a specific embodiment of the present application, the titanium source is liquid, and an amount ratio of the copper source and the titanium source is (0.5 g to 2.0 g):(0.2 mL to 0.8 mL). In the present application, the volume ratio of the titanium source and the organic solvent is preferably (0.2-0.8):15. In the present application, the organic solvent is preferably N, N-dimethylformamide.

In that present application, the mixing of the intermediate, the titanium source and the organic solvent is preferably carried out in a polytetrafluoroethylene thick-wall pressure-resistant bottle; the mixing preferably includes sequentially adding the organic solvent and the titanium source to the intermediate. In the present application, the mixing is preferably carried out under ultrasonic dispersion; the duration of the mixing is preferably 30 min.

In the present application, the second solvothermal reaction is preferably carried out under microwave, and in a specific embodiment of the present application, the second solvothermal reaction is carried out in a microwave reactor. In the present application, the temperature of the second solvothermal reaction is preferably 200° C. to 300° C. more preferably 250° C. to 300° C.; the duration of the second solvothermal reaction is preferably 12 h to 36 h, more preferably 24 h. According to the present application, a microwave method is adopted, so that the reaction system can be heated uniformly, and the reaction process can be accurately regulated and controlled, so that the controllable preparation of the morphology and structure of the MOFs can be realized, and the synthesis efficiency of the MOFs is greatly improved.

In the present application, after the second solvothermal reaction, it is preferable to further include: naturally cooling the obtained reaction system to room temperature, and after solid-liquid separation, washing and drying the obtained solid substance in turn to obtain the intermediate. In the present application, the solid-liquid separation method is preferably vacuum filtration. In the present application, the washing preferably includes water washing, methanol washing and acetone washing which are carried out in sequence; the mode of the washing is preferably rinsing. In the present application, the drying is preferably vacuum drying; the temperature of the drying is preferably 30° C. to 90° C., more preferably 60° C.; the duration of the drying is preferably 12 h to 24 h.

The present application further provides layered super-hydrophilic Ti—Cu-MOFs prepared by the preparation method in the technical solution, which have a lamellar structure; the surfaces of the layered super-hydrophilic Ti—Cu-MOFs contain hydroxyl groups. In a specific embodiment of the present application, the layered super-hydrophilic Ti—Cu-MOFs are brown.

The present application further provides use of the layered super-hydrophilic Ti—Cu-MOFs prepared by the preparation method in the above technical solution or the layered super-hydrophilic Ti—Cu-MOFs in the above technical solution as an adsorption filler for detecting a phenothiazine drug and a metabolite thereof. In the present application, the phenothiazine drug and a metabolite thereof preferably include chlorpromazine, chlorpromazine sulfoxide, promethazine and promethazine sulfoxide.

In the present application, the method of the use preferably includes: adsorbing the complex matrix in the biological sample with layered super-hydrophilic Ti—Cu-MOFs, and purifying phenothiazine drugs and residues of metabolites thereof in a biological sample in one step. In the present application, the biological sample is preferably plasma.

In a specific embodiment of the present application, the method of the use includes the following steps: mixing a plasma sample, layered super-hydrophilic Ti—Cu-MOFs and acidified acetonitrile, and centrifuging to obtain a supernatant; analyzing the supernatant by ultra-fast liquid chromatography-tandem mass spectrometry to obtain the contents of phenothiazine drugs and metabolites thereof in the plasma sample. In the present application, the mass ratio of the plasma sample and the layered super-hydrophilic Ti—Cu-MOFs is preferably (0.2-1.0):(0.01-0.1), more preferably 1.0:0.05; an amount ratio of the plasma sample and the acidified acetonitrile is preferably (0.2 g to 1.0 g):(1.0 mL to 3.0 mL), more preferably 1.0 g:2.0 mL. In the present application, the acidified acetonitrile is preferably acetonitrile containing 0.5 vol % formic acid. In the present application, the mixing of the plasma sample, the layered super-hydrophilic Ti—Cu-MOFs and the acidified acetonitrile preferably includes: centrifuging the plasma sample, the layered super-hydrophilic Ti—Cu-MOFs and the acidified acetonitrile for 1 min to 5 min. In the present application, the rotational speed of the centrifugation is preferably 12,000 r/min; the duration of the centrifugation is preferably 5 min to 10 min. The present application has no special requirements on the specific conditions of the ultra-fast liquid chromatography-tandem mass spectrometry (UFLC-MS/MS), and the methods well known to those skilled in the technology can be adopted.

In the following, the technical solution in the present application will be described clearly and completely in combination with the examples in the present application. Obviously, the described examples are only a part of the embodiment of the present application, not the whole examples. Based on the examples in the present application, all other examples obtained by those skilled in the technology without creative labor belong to the scope of protection of the present application.

EXAMPLES 1 to 9

(1) A copper source, a rigid aromatic amine ligand, a stabilizer and 30 mL of pure water were added into a polytetrafluoroethylene thick-walled pressure-resistant bottle, which was then sealed with a polytetrafluoroethylene screw plug, and subjected to ultrasonically dispersing for 30 min;

(2) the polytetrafluoroethylene thick-wall pressure-resistant bottle in step (1) was transferred into a microwave reactor, the reaction temperature was set at 180° C., and a solvothermal reaction was carried out at this temperature for 24 h;

(3) after the solvothermal reaction in step (2) was completed, the mixture was naturally cooled to room temperature, filter residues were collected by vacuum filtration, and were sequentially eluted with water, methanol and acetone, and were then subjected to vacuum drying at 60° C. for 12 h;

(4) the product obtained in the step (3) was added into a polytetrafluoroethylene thick-wall pressure-resistant bottle, followed by 15 mL of N, N-dimethylformamide and a titanium source sequentially, and the bottle was then sealed with a polytetrafluoroethylene screw plug, and subjected to ultrasonically dispersing for 30 min;

(5) the polytetrafluoroethylene thick-wall pressure-resistant bottle in step (4) was transferred into a microwave reactor, the reaction temperature was west at 300° C., and a solvothermal reaction was carried out at this temperature for 24 h;

(6) after the solvothermal reaction in step (5) was completed, the mixture was naturally cooled to room temperature, filter residues were collected by vacuum filtration, and were sequentially eluted with water, methanol and acetone, and were then subjected to vacuum drying at 60° C. for 12 hours to obtain brown layered super-hydrophilic Ti—Cu-MOFs.

The operation steps of Examples 1 to 9 were the same, and the raw material formula is shown in Table 1.

TABLE 1

| | | | | | | | Example | | | | |
|---|---|---|---|---|---|---|---|---|---|---|---|
| Raw Material Formulas of Examples 1-9 | | | | | | | | | | | |
| category | Component | 1 | 2 | 3 | 4 | 5 | 6 | 7 | 8 | 9 | |
| Copper source | Copper acetate, g | 0.5 | 1.0 | 2.0 | / | / | / | 1.0 | 1.0 | 1.0 | |
| | Copper nitrate, g | / | / | / | 0.5 | 1.0 | 2.0 | / | / | / | |
| Rigid aromatic | 4,4'-diamino-terphenyl, g | 0.5 | 1.0 | 2.0 | 0.5 | 1.0 | 2.0 | / | / | / | |
| amine ligand | Tris (4-aminophenyl)amine, g | / | / | / | / | / | / | 1.0 | 1.0 | 1.0 | |
| stabilizing agent | Aminosulfonic acid, g | 0.2 | 0.4 | 0.8 | 0.2 | 0.4 | 0.8 | 0.4 | / | / | |
| | P-aminobenzoic acid, g | / | / | / | / | / | / | / | 0.4 | 0.4 | |
| Titanium source | Tetrabutyl titanate, mL | 0.2 | 0.4 | 0.8 | 0.2 | 0.4 | 0.8 | 0.4 | 0.4 | / | |
| | Tetraisobutyl titanate, mL | / | / | / | / | / | / | / | / | 0.4 | |

TEST EXAMPLE 1

Figure 2:
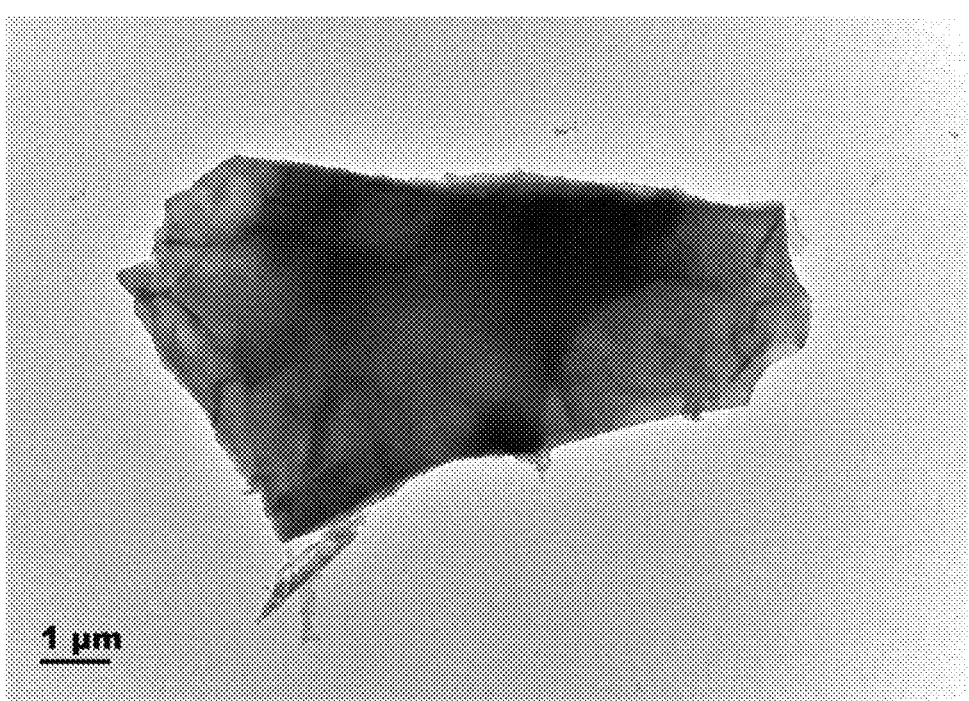
FIG. 2 is a scanning electron microscope diagram of layered super-hydrophilic Ti—Cu-MOFs prepared in Example 1.

The transmission electron microscope and scanning electron microscope of the layered super-hydrophilic Ti—Cu-MOFs prepared in Example 1 are shown in FIG. 1 and FIG. 2 respectively. As can be seen from FIG. 1, the layered super-hydrophilic Ti—Cu-MOFs prepared by the present application had regular morphology and obvious lamellar structure, which is further confirmed by the scanning electron microscope characterization results in FIG. 2.

The layered super-hydrophilic Ti—Cu-MOFs prepared in Examples 2-9 were similar in morphology to the layered super-hydrophilic Ti—Cu-MOFs prepared in Example 1, and the surface was rich in hydroxyl groups. The layered super-hydrophilic Ti—Cu-MOFs prepared in Examples 2-9 had high adsorption capacity for phospholipid co-extracts in clinical biological samples, and could further realize efficient separation and purification of complex matrices in clinical biological samples.

APPLICATION EXAMPLE

Evaluation of separation and purification performance of layered super-hydrophilic Ti—Cu-MOFs for phenothiazine drugs and residues of metabolites thereof in clinical biological samples: 10.0 mg of standards of chlorpromazine hydrochloride (D.R. Company of Germany, a purity of 99.5 wt %), promethazine hydrochloride (D.R. Company of Germany, a purity of 99.0 wt %) and chlorpromazine sulfoxide (Toronto Company of Canada, a purity of 98.0 wt %), promethazine sulfoxide (Toronto Company of Canada, a purity of 98.0 wt %) were accurately weighed and put in four 10 mL volumetric flasks, dissolved with a small amount of methanol, and then adjusted to the scale with methanol to prepare a standard stock solution of 1.0 g/L, which was then stored in a refrigerator at 4° C. for later use. A mixed standard solution with a concentration of 1.0 mg/L was prepared from the standard stock solutions of the above phenothiazine drugs and metabolites thereof. A group of blank plasma samples (1.0 g each) was weighed and put into 5.0 mL centrifuge tubes, and mixed standard solutions of four phenothiazine drugs and metabolites thereof was added to the tubes respectively to prepare a series of low, medium and high spiked levels with scalars of 0.16 μg/kg, 1.6 μg/kg and 8.0 μg/kg; 50 mg of the layered super-hydrophilic Ti—Cu-MOFs prepared in Example 1 and 2.0 mL of acidified acetonitrile (acetonitrile containing 0.5 vol % formic acid) were added to the centrifuge tubes in turn, and centrifuged for 5 min at 12,000 r/min. The supernatant was analyzed by ultra-fast liquid chromatography-tandem mass spectrometry (UFLC-MS/MS).

Figure 3:
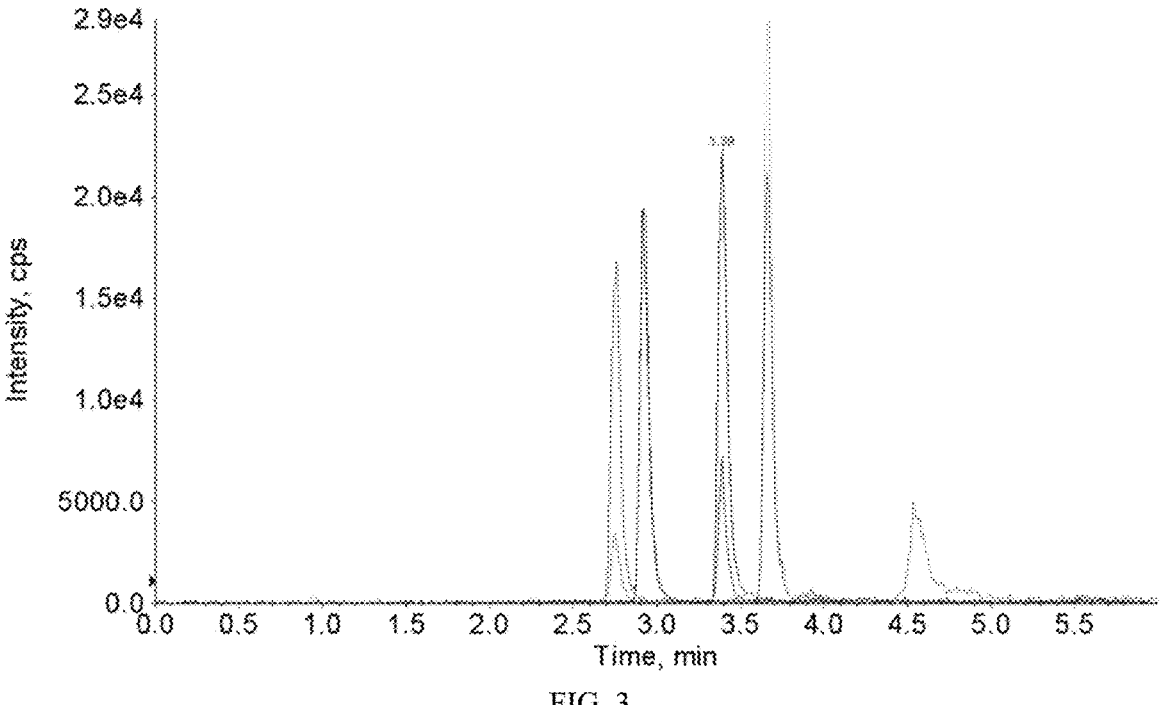
FIG. 3 is the LC-MS/MS spectrum of phenothiazine drugs and residues of metabolites thereof in plasma after purification in an application example.

The MRM patterns of four phenothiazine drugs and metabolites thereof with a spiked concentration of 0.16 μg/kg are shown in FIG. 3. From FIG. 3, it can be seen that layered super-hydrophilic Ti—Cu-MOFs have good purification and adsorption capacity for complex matrices in biological samples, and there is no interference peak at the peak position of thiazine drugs and metabolites thereof.

The chromatographic conditions of the ultra-fast liquid chromatography-tandem mass spectrometry are as follows:

Chromatographic column: Shim-pack XR-ODS II (150 mm×2.0 mm i.d., 2.2 μm); mobile phase: phase A: water phase (an aqueous solution of 0.1 vol % formic acid); phase B: acetonitrile. The gradient elution procedure is shown in Table 2. Flow rate: 0.3 mL/min; sample size 2.0 μL.

TABLE 2

| Gradient elution procedure | |
|---|---|
| Time | Mobile phase ratio (volume ratio) |
| 0→2.00 min | 10→60.0% B |
| 2.00→5.00 min | 60→90.0% B |
| 5.00→7.50 min | 90.0% B |
| 7.50→8.00 min | 90.0→10% B |
| 8.00→10.00 min | 10% B |

The mass spectrometry conditions of the ultra-fast liquid chromatography-tandem mass spectrometry are as follows:

Ion source: Electrospray Ionization (ESI); scanning mode: positive ion scanning; quantitative detection mode: Multiple Reaction Monitoring (MRM); electrospray voltage (IS): 4500V; atomizing gas pressure (GS1): 50.0 psi; auxiliary gas flow rate (GS2): 50.0 psi; air curtain pressure (CUR): 20.0 psi; collision gas (CAD): 8.0 psi; ion source temperature (TEM): 500° C.; scanning time: 50 ms; the outlet voltage of a collision chamber (CXP): 11.0 V; the inlet voltage of the collision chamber (EP): 10.0 V; see Table 3 for qualitative ion pairs, quantitative ion pairs, collision gas energy (CE) and declustering potential (DP).

TABLE 3

| | Parent ion (m/z) | Daughter ion (m/z) | Collision gas energy (eV) | Declustering potential (v) | Retention time (min) |
|---|---|---|---|---|---|
| Compound | | | | | |
| Chlorpromazine | 319.2 | 86.0*, 57.9 | 26, 56 | 80 | 3.62 |
| Chlorpromazine sulfoxide | 335.1 | 86.0*, 232.0 | 30, 50 | 100 | 2.96 |
| Promethazine | 285.2 | 86.0*, 198.0 | 25, 40 | 130 | 3.39 |
| Promethazine sulfoxide | 302.1 | 86.0*, 240.1 | 30, 35 | 150 | 2.71 |

Qualitative ion pair, quantitative ion pair, collision gas energy, declustering potential and retention time of a target In Table 3, * represents quantitative ions.

Figure 4:
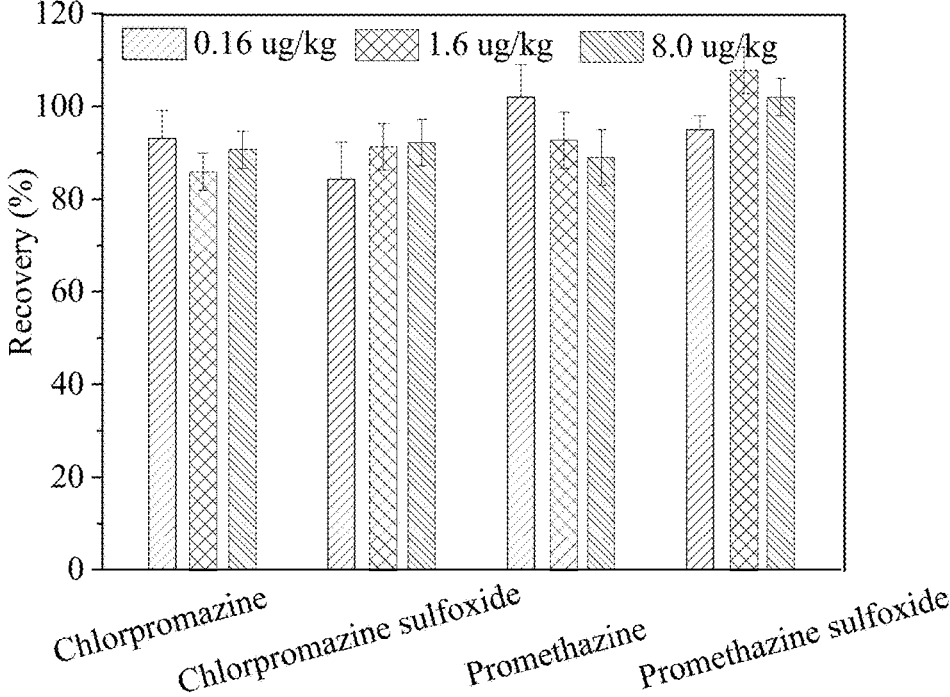
FIG. 4 is the recovery chart of phenothiazine drugs and residues of metabolites thereof in plasma in the application example.

The recoveries of phenothiazine drugs and metabolites thereof, i.e., chlorpromazine, chlorpromazine sulfoxide, promethazine and promethazine sulfoxide, are shown in FIG. 4. It can be seen from FIG. 4 that the recovery rate of phenothiazine drugs and metabolites thereof is 82.2%-108%, and the relative standard deviation is less than 10%, which fully meets the requirements of clinical test methodology. The experimental results verify that the layered super-hydrophilic Ti—Cu-MOFs prepared by the present application can efficiently remove the complex matrices in the plasma sample, thereby effectively eliminating the influence of the matrix effect on the qualitative and quantitative analysis of phenothiazine drugs and metabolites thereof.

The above is only the preferred embodiment of the present application, and it should be pointed out that a person skilled in the technology can make several improvements and embellishments without departing from the principle of the present application, and these improvements and embellishments should also be regarded as the protection scope of the present application.

What is claimed is:

1. A preparation method for layered hydrophilic Ti—Cu-MOFs, comprising the following:

mixing a copper source, a rigid aromatic amine ligand, a stabilizer and water, and carrying out a first solvothermal reaction to obtain an intermediate, wherein the rigid aromatic amine ligand comprises at least one of 4,4'-diamino-triphenyl ligand and tris(4-aminophenyl) amine ligand; and mixing the intermediate, a titanium source and an organic solvent, and carrying out a second solvothermal reaction to obtain the layered hydrophilic Ti—Cu-MOFs.

2. The preparation method according to claim 1, wherein the copper source is copper salt; and the stabilizer comprises at least one of sulfamic acid and p-aminobenzoic acid.

3. The preparation method according to claim 1, wherein a mass ratio of the copper source, the rigid aromatic amine ligand and the stabilizer is (0.5-2.0):

(0.5-2.0): (0.2-0.8).

4. The preparation method according to claim 1, wherein the first solvothermal reaction is carried out under microwave; a temperature of the first solvothermal reaction is 90° C. to 200° C.; and a duration of the first solvothermal reaction is 12 h to 36 h.

5. The preparation method according to claim 1, wherein the titanium source comprises at least one of tetrabutyl titanate and tetraisobutyl titanate.

6. The preparation method according to claim 1, wherein a mass ratio of the copper source and the titanium source is (0.5-2.0): (0.2-0.8).

7. The preparation method according to claim 1, wherein the second solvothermal reaction is carried out under microwave; a temperature of the second solvothermal reaction is 200° C. to 300° C.; and a duration of the second solvothermal reaction is 12 h to 36 h.

8. Layered hydrophilic Ti—Cu-MOFs prepared by the preparation method according to claim 1, wherein the Ti—Cu-MOFs have a lamellar structure; and the layered hydrophilic Ti—Cu-MOFs comprises a hydroxyl group on surface.

* * * * *